US008804744B2

(12) United States Patent
Gao et al.

(10) Patent No.: US 8,804,744 B2
(45) Date of Patent: Aug. 12, 2014

(54) METHOD AND DEVICE FOR TRANSMITTING DATA BASED ON A RELAY MOBILE COMMUNICATION SYSTEM

(75) Inventors: Youjun Gao, Beijing (CN); Zhenping Hu, Beijing (CN); Ning Yang, Beijing (CN); Weimin Wu, Beijing (CN); Desheng Wang, Beijing (CN); Xiaowei Jiang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 145 days.

(21) Appl. No.: 13/501,785

(22) PCT Filed: Oct. 13, 2010

(86) PCT No.: PCT/CN2010/077702
§ 371 (c)(1),
(2), (4) Date: May 15, 2012

(87) PCT Pub. No.: WO2011/044839
PCT Pub. Date: Apr. 21, 2011

(65) Prior Publication Data
US 2012/0230248 A1    Sep. 13, 2012

(30) Foreign Application Priority Data

Oct. 16, 2009    (CN) .......................... 2009 1 0236027

(51) Int. Cl.
*H04L 12/28*    (2006.01)
*H04L 29/06*    (2006.01)
*H04L 29/08*    (2006.01)

(52) U.S. Cl.
CPC .......... *H04L 63/0876* (2013.01); *H04L 69/322* (2013.01); *H04L 69/161* (2013.01)
USPC ..................................................... 370/395.5

(58) Field of Classification Search
CPC ............ H04L 61/6022; H04L 63/0876; H04L 2012/6448; H04L 69/161; H04L 69/30; H04L 69/322
See application file for complete search history.

(56) References Cited

U.S. PATENT DOCUMENTS

| 8,285,197 | B2 * | 10/2012 | Preiss et al. .................. 455/3.01 |
| 2007/0097926 | A1 * | 5/2007 | Liu et al. ........................ 370/335 |
| 2007/0286159 | A1 * | 12/2007 | Preiss et al. ................... 370/352 |
| 2008/0276003 | A1 | 11/2008 | Dudley et al. |
| 2009/0196301 | A1 * | 8/2009 | Parsons ........................ 370/400 |

FOREIGN PATENT DOCUMENTS

| CN | 1716830 A | 1/2006 |
| CN | 101384020 A | 3/2009 |

OTHER PUBLICATIONS

International Search Report cited in PCT/CN2010/077702, dated Jan. 27, 2011.

* cited by examiner

*Primary Examiner* — Phuc Tran
(74) *Attorney, Agent, or Firm* — Workman Nydegger (57) ABSTRACT

A method for data transmission based on a relay mobile communication system and an equipment thereof are provided by the present invention. The method includes: at least two transport planes are configured on the Un interface protocol stack of the relay equipment and the base station eNode B; the relay equipment and the eNode B transmit the data via at least two transport planes configured on the Un interface protocol stack. With the present invention, the throughput rate of the Un interface between the relay equipment and the eNode B in the relay mobile communication system is improved, and the time delay of the Un interface is reduced.

15 Claims, 6 Drawing Sheets

METHOD AND DEVICE FOR TRANSMITTING DATA BASED ON A RELAY MOBILE COMMUNICATION SYSTEM

The present application is a US National Stage of International Application No. PCT/CN2010/077702, filed Oct. 13, 2010, designating the United States, and claiming priority to Chinese Patent Application No. 200910236027.X filed Oct. 16, 2009. Both of the aforementioned applications are incorporated herein in their entirety.

FIELD OF THE INVENTION

The present invention relates to the field of mobile communications and particularly to a method and device for transmitting data based on a relay mobile communication system.

BACKGROUND OF THE INVENTION

In the $3^{rd}$ Generation (3G) and Beyond $3^{rd}$ Generation (B3G) mobile communication systems, the coverage area of a cell is typically an important metric index of a radio access system which typically covers a radio service area through an eNodeB or an access point. However a user equipment may be located outside the service area due to mobility of the user equipment and consequently fails to access a radio access service, and even if the user equipment is located within the service area, transmission of a signal may be obscured by an obstacle on a transmission path, thereby degrading the quality of the service. For this reasons and in order to address seamless coverage of the service area and an increased system capacity at a as low cost as possible, the technology of "relay" has been proposed in a technical solution of future (3G LTE) mobile communication so that a signal can be relayed through a Relay Node (RN) or a Relay Station (RS) when the user equipment is located outside the service area or the quality of the signal can not be satisfactory to thereby extend the service area or to improve the reliability of transmission for the purpose of extending the coverage area and the capacity of a cell.

Figure 1:
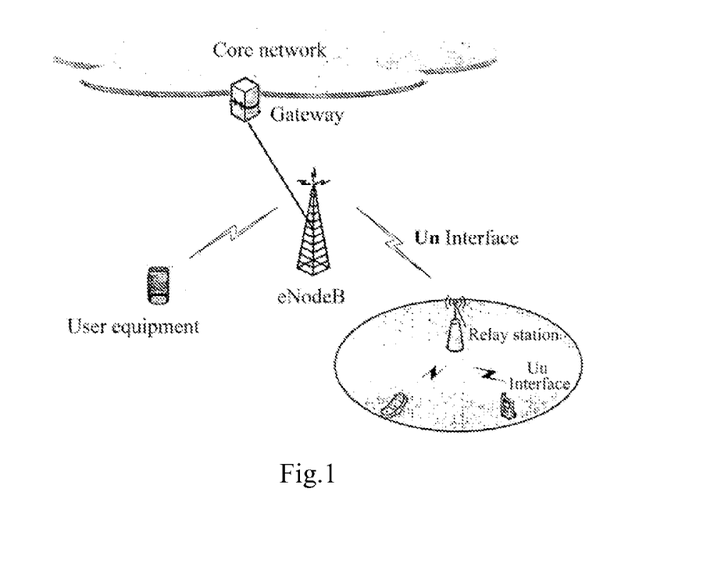
FIG. 1 is a topology diagram of an access network of a mobile communication system with a Relay Station (RS)

Reference is made to FIG. 1 illustrating a topology diagram of an access network of a mobile communication system with a Relay Station (RS), where a User Equipment (UE) can communicate with the side of a core network directly through an eNodeB, and when the UE is located outside a coverage area of the eNodeB or can not communicate with the eNodeB because a radio transmission link between the UE and the eNodeB is obscured by an obstacle, the UE can communicate with the eNode B through the RS relaying a signal, so that the UE can communicate with the eNodeB even in the foregoing situations for the purpose of extending the coverage area and the capacity of a cell. Particularly an air interface between the UE and the RS is a Uu interface and an air interface between the RS and the eNodeB is a Un interface.

At present, how to improve the throughput of the Un interface and to enhance a delay characteristic of the Un interface as a general performance index of a Un interface design has also become an issue under discussion and to be addressed in the industry.

SUMMARY OF THE INVENTION

Embodiments of the invention provide a method and device for transmitting data based on a relay mobile communication system in order to improve the throughput of a Un interface between a relay device and an eNodeB in the relay mobile communication system and to lower a delay of the Un interface.

In order to address the foregoing problem, an embodiment of the invention proposes a method for transmitting data based on a relay mobile communication system, which includes: configuring at least two transmission planes on protocol stacks of Un interface of a relay device and an eNodeB; and the relay device and the eNodeB transmitting data over the at least two transmission planes configured on the protocol stacks of Un interface.

An embodiment of the invention further proposes a device for transmitting data based on a relay mobile communication system, wherein there are at least two transmission planes configured on a protocol stack of Un interface of the device, and the device includes a data transmission unit configured to transmit data over the at least two transmission planes configured on the protocol stack of Un interface.

In the solutions of the embodiments of the invention, at least two transmission planes are configured respectively on protocol stacks of Un interface in a relay device and an eNodeB of a relay mobile communication system, and then the relay device and the eNodeB transmit data over the at least two transmission planes configured respectively on the protocol stacks of Un interface, and since there are a plurality of transmission planes, over which data is transmitted, configured on the protocol stacks of Un interface, the throughput of a Un interface between the relay device and the eNodeB in the relay mobile communication system can be well improved and the problem of a delay in transmission due to insufficiency of a transmission plane occupied for the data can be avoided.

BRIEF DESCRIPTION OF THE DRAWINGS

The embodiments of the invention will be further set forth in details below with reference to the respective drawings in which:

FIG. 9 is a schematic diagram of a process in which the relay and the eNodeB transmit retransmission data over a

DETAILED DESCRIPTION OF THE EMBODIMENTS

In the embodiments of the invention, it is proposed in a relay mobile communication system to configure at least two transmission planes on protocol stacks of Un interface of a relay device and an eNodeB so that the relay device and the eNodeB can transmit data over the transmission planes configured on the protocol stacks of Un interface for the purpose of providing a plurality of transmission planes over which data is transmitted, thereby improving the throughput of a Un interface between the relay device and the eNodeB and lowering a transmission delay of the Un interface. The relay device as referred to in the embodiments of the invention may be a Relay Node (RN) or a Relay Station (RS). The relay device which is an RN or an RS performs the same process in a specific application, and a detailed technical solution in the embodiments of the invention will be described below in the embodiments in which the relay device is an RS.

Figure 2:
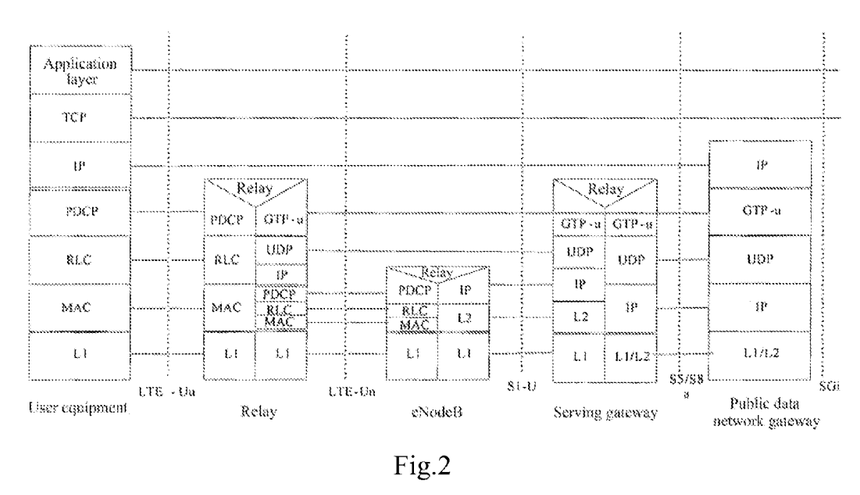
FIG. 2 is a schematic structural diagram of a user transmission plane on protocol stacks of Un interface of the RS and an eNodeB.
Figure 3:
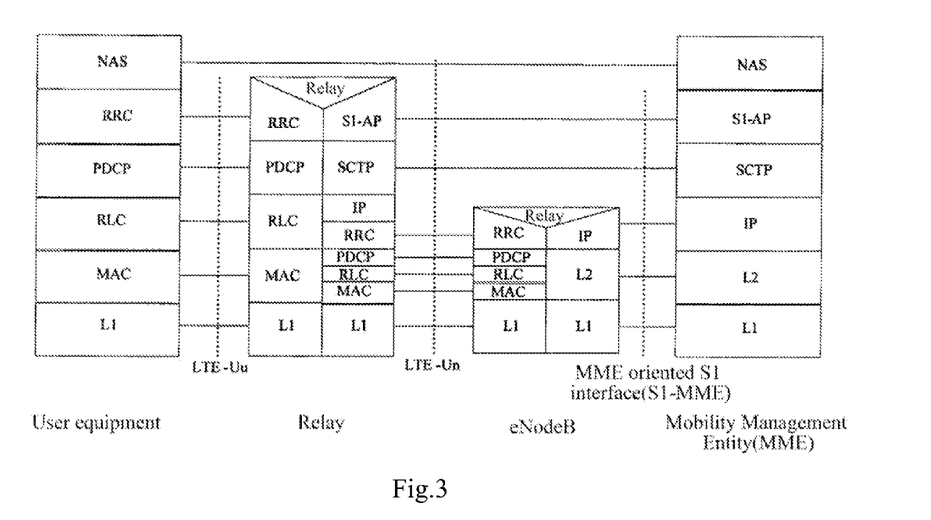
FIG. 3 is a schematic structural diagram of a control transmission plane on protocol stacks of Un interface of the RS and the eNodeB.

Particularly the plurality of transmission planes configured on the protocol stacks of Un interface of the RS and the eNodeB include a user transmission plane and a control transmission plane. Reference is made to FIG. 2 illustrating a schematic structural diagram of a user transmission plane on the protocol stacks of Un interface of the RS and the eNodeB, where the user transmission plane includes the physical layer (L layer), the Media Access Control (MAC) layer, the Radio Link Control (RLC) entity layer and the Packet Data Convergence Protocol (PDCP) layer, and to FIG. 3 illustrating a schematic structural diagram of a control transmission plane on the protocol stacks of Un interface of the RS and the eNodeB, where the control transmission plane includes the physical layer (L layer), the MAC layer, the RLC entity layer, the PDCP layer and the Radio Resource Control (RRC) layer.

Figure 4:
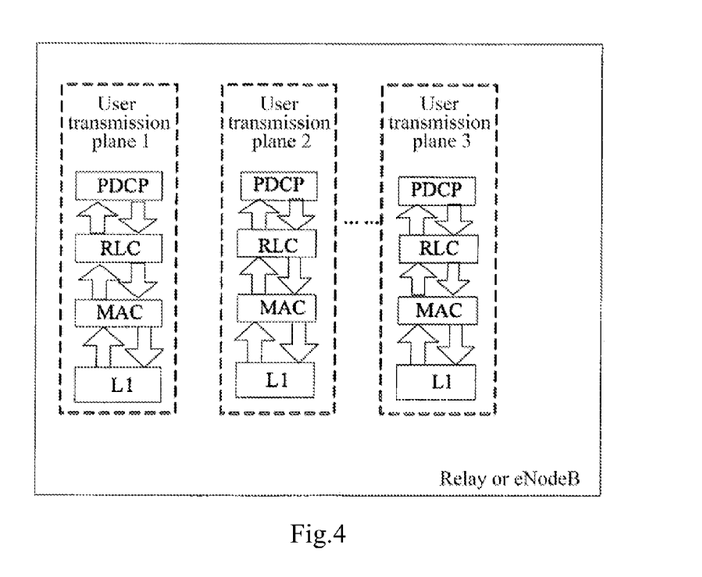
FIG. 4 is a schematic diagram of a plurality of user transmission planes configured on the protocol stacks of Un interface of the RS and the eNodeB.

Reference is made to FIG. 4 illustrating a schematic diagram of a plurality of user transmission planes configured on the protocol stacks of Un interface of the RS and the eNodeB, and here configuration of three user transmission planes will be described by way of an example, where different service data including data for different UEs, retransmission data, new transmission data and other data can be transmitted over the respective user transmission planes.

Figure 5:
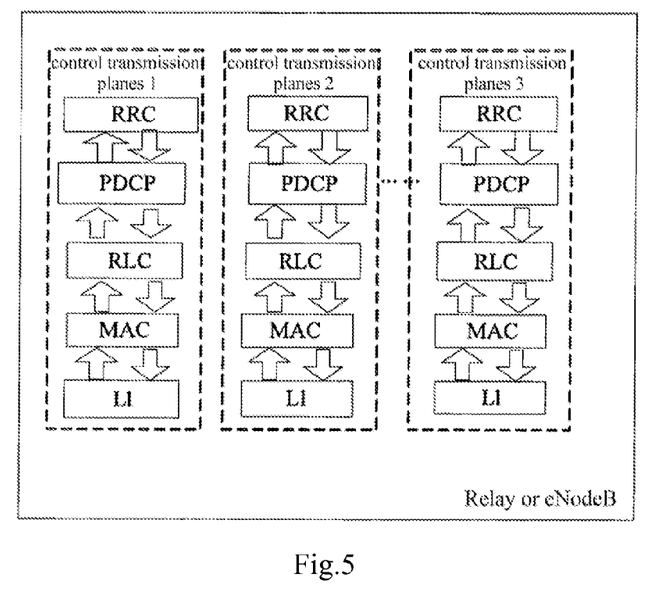
FIG. 5 is a schematic diagram of a plurality of control transmission planes configured on the protocol stacks of Un interface of the RS and the eNodeB.

Reference is made to FIG. 5 illustrating a schematic diagram of a plurality of control transmission planes configured on the protocol stacks of Un interface of the RS and the eNodeB, and here configuration of three user transmission planes will be described by way of an example, where different control signaling data can be transmitted over the respective control transmission planes.

More particularly in an embodiment of the invention, one MAC PDU is generated in each of the at least two transmission planes configured on the protocol stacks of Un interface, and data is transmitted in the generated MAC PDU. Correspondingly a plurality of MAC PDUs will be transmitted via the Un interface.

Moreover at least one of an MAC layer entity, an RLC layer entity and a PDCP layer entity can be shared among the at least two transmission planes configured on the protocol stacks of Un interface to transmit data; or the at least two transmission planes configured on the protocol stacks of Un interface can transmit data respectively through their own MAC layer entities, RLC layer entities and PDCP layer entities, that is, an MAC layer entity, an RLC layer entity and a PDCP layer entity of one transmission plane are separate respectively from an MAC layer entity, an RLC layer entity and a PDCP layer entity of another transmission plane.

Particularly when a MAC layer entity is shared among the at least two transmission planes configured on the protocol stacks of Un interface, the MAC layer entity can generate a plurality of MAC PDUs respectively in a plurality of Hybrid Automatic Repeat reQuest (HARQ) processes, that is, generate one MAC PDU respectively for each of the different transmission planes in one of the plurality of HARQ processes, and particularly one HARQ entity can generate one or more HARQ processes.

In particular the RS and the eNodeB transmit data over the plurality of control transmission planes configured on their own protocol stacks of Un interface in the following several implementations (but will not be limited thereto):

In a first implementation, the RS and the eNodeB divide the at least two transmission planes configured on the protocol stacks of Un interface into at least two groups and then transmit new transmission data over one of the divided-into groups of transmission planes and retransmission data over another divided-into group of transmission planes. As illustrated in FIG. 4 or FIG. 5, the RS and the eNodeB can transmit new transmission data over a user transmission plane 1 or a control transmission plane 1 and retransmission data over a user transmission plane 2 or a control transmission plane 2, that is, when the RS and the eNodeB determines data to be transmitted as new transmission data, the data to be transmitted is configured to be transmitted over the user transmission plane 1 or the control transmission plane 1, and when data to be transmitted is determined as retransmission data, the data to be transmitted is configured to be transmitted over the user transmission plane 2 or the control transmission plane 2. Particularly the transmission plane 2 over which retransmission data is transmitted can be configured by further configuring the number of times that an HARQ is retransmitted to thereby address the problem of a delay in transmission of new data because the RS and the eNodeB transmit preferentially data to be retransmitted, in a Hybrid Automatic Repeat reQuest (HARQ) based data transmission process, if retransmission of the retransmission data and transmission of the new data is requested at the same time but only one transmission plane is arranged, so that the new service data can be transmitted as fast as possible.

In a second implementation, the RS and the eNodeB determines a Quality of Service (QoS) level required for data to be transmitted and then select a transmission plane, over which the determined QoS level can be provided, from the at least two transmission planes configured on the protocol stacks of Un interface, and thus the RS and the eNodeB can transmit the data to be transmitted over the selected transmission plane. That is, the RS and the eNodeB can place data with the same QoS demand over the same transmission plane for transmission and data with a different QoS demand over a different transmission plane for transmission to thereby support a multi-QoS service. As illustrated in FIG. 4 or FIG. 5, for example, the RS and the eNodeB can transmit data with a demand QoS1 over the user transmission plane 1 or the control transmission plane 1 and data with a demand QoS2 over the user transmission plane 2 or the control transmission plane 2, so that the RS and the eNodeB can transmit data with different QoS demands and thus meet the qualities of communication for different services, particularly the quality of communication for a VoIP service.

In a third implementation, the RS and the eNodeB determines among the at least two transmission planes configured on the protocol stacks of Un interface a transmission plane serving a UE, corresponding to transmission data, e.g., a UE to which the transmission data is to be transmitted or from which the transmission data is transmitted, etc., identified by the identifier of the UE, according to the identifier of the UE and then transmit the transmission data corresponding to the UE over the determined transmission plane. That is, all the UEs served by the RS or the eNodeB are grouped, and each of the transmission planes configured on the protocol stacks of Un interface is responsible for transmission of data transmitted from or received by one of the groups of UEs, and the RS or the eNodeB can store a correspondence relationship between the identifiers of the respective transmission planes configured on the protocol stacks of Un interface and the identifiers of UEs for which the transmission plane is responsible, and thus prior to each transmission of data, the RS or the eNodeB firtly checks the identifier of a UE corresponding to the data to be transmitted, then searches the stored correspondence relationship for the identifier of a transmission plane corresponding to the identifier of the UEs and then places the corresponding data over the transmission plane identified by the searched identifier of the transmission plane. As illustrated in FIG. 4 or FIG. 5, for example, the RS and the eNodeB can transmit data transmitted from and received by a UE 1 and a UE2 hosted by the RS and the eNodeB over the user transmission plane 1 or the control transmission plane 1 and data transmitted from and received by a UE3 and a UE4 hosted by the RS and the eNodeB over the user transmission plane 2 or the control transmission plane 2.

In a fourth implementation, the RS and the eNodeB determine among the at least two transmission planes configured on the protocol stacks of Un interface a second transmission plane where an RLC entity, consistent with an RLC entity identifier represented in bit information borne in a bit reserved in an MAC layer header of transmission data at the MAC layer in a first transmission plane, is located according to the bit information and then forward the transmission data at the MAC layer in the first transmission plane to the RLC entity in the determined second transmission plane for further transmission.

Figure 6:
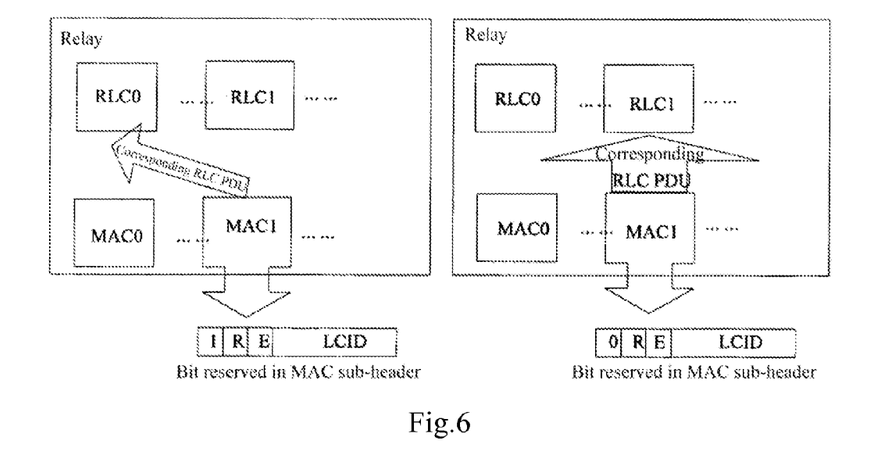
FIG. 6a and FIG. 6b are schematic diagrams of the RS forwarding data transmitted at the MAC layer in one transmission plane to the RLC layer in another transmission plane for further transmission.

Since there are at least two transmission planes configured on the protocol stacks of Un interface, such a situation may arise that different MAC layers in different transmission planes are multiplexed, and a receiver can exactly forward data transmitted at the MAC layer in one transmission plane to the RLC layer in another transmission plane for further transmission, according to relevant bit information in a bit reserved in an MAC layer header of transmission data and the identifier of an RLC entity, to which the data is to be forwarded, identified by the borne relevant bit information. For example, if there are two transmission planes, numbered 0 and 1 respectively, configured on the protocol stacks of Un interface, then relevant bit information can be borne in one bit reserved in an MAC layer header of transmission data and the identifier of an RLC entity to which the data is to be forwarded can be identified according to the borne relevant bit information. Particular reference is made to FIG. 6a and FIG. 6b illustrating schematic diagrams of an RS forwarding data transmitted at the MAC layer in one transmission plane to the RLC layer in another transmission plane for further transmission, and here the RS which is an execution body will be described by way of an example (the same execution process will apply to the eNodeB). The RS firstly detects bit information borne in a bit reserved in an MAC layer header of data from a user M, and if the bit information borne in the reserved bit is 0 (as illustrated in FIG. 6a), then the RS will forward the data to an entity RLC0 in the transmission plane 0 for further transmission to thereby forward the data of the user M from an MAC1 in the transmission plane 1 to the RLC0 in the transmission plane 0 for further transmission; or if the bit information borne in the reserved bit is 1 (as illustrated in FIG. 6b), then the RS will forward the data to an entity RLC1 in the transmission plane 1 for further transmission to thereby transmit the data of the user M as a whole over the transmission plane 1.

Figure 7A:
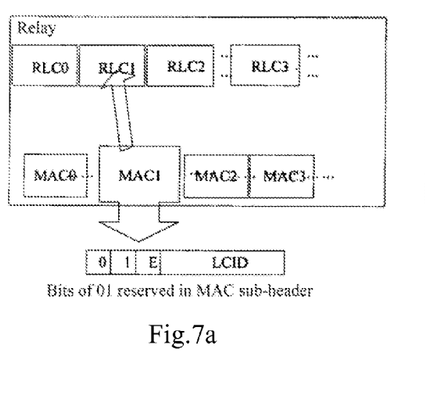
FIG. 7a, FIG. 7b, FIG. 7c and FIG. 7d are schematic diagrams of the RS forwarding data transmitted at the MAC layer in one transmission plane to the RLC layer in another transmission plane for further transmission.
Figure 7B:
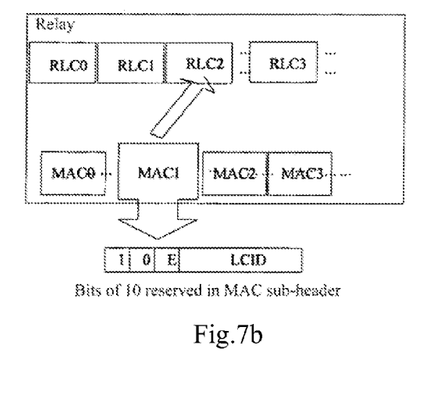
Figure 7C:
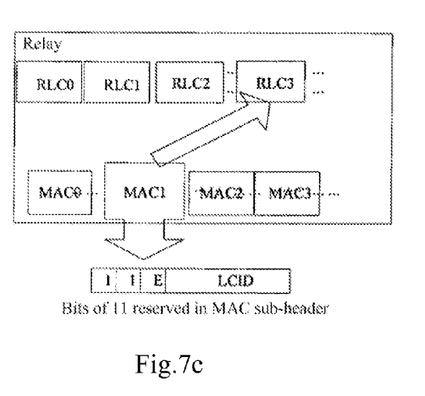
Figure 7D:
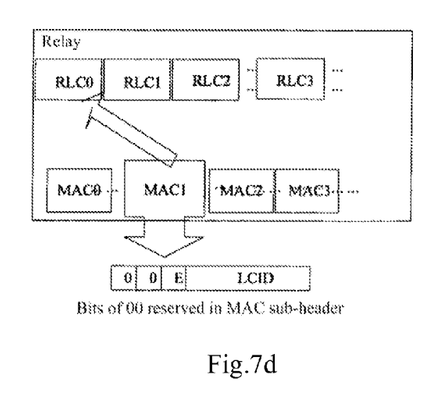

In another example, if there are four transmission planes, numbered 0, 1, 2 and 3 respectively, configured on the protocol stacks of Un interface, then relevant bit information can be borne in two bits reserved in an MAC layer header of transmission data and the identifier of an RLC entity to which the data is to be forwarded can be identified according to the borne relevant bit information. Particular reference is made to FIG. 7a, FIG. 7b, FIG. 7c and FIG. 7d illustrating schematic diagrams of an RS forwarding data transmitted at the MAC layer in one transmission plane to the RLC layer in another transmission plane for further transmission, and here also the RS which is an execution body will be described by way of an example (the same execution process will apply to the eNodeB). The RS firstly detects bit information borne in bits reserved in an MAC layer header of data from a user M, and if the bit information borne in the reserved bits is 01 (as illustrated in FIG. 7a), then the RS will forward the data to an entity RLC1 in the transmission plane 1 for further transmission to thereby transmit the data of the user M as a whole over the transmission plane 1; if the bit information borne in the reserved bits is 10 (as illustrated in FIG. 7b), then the RS will forward the data to an entity RLC2 in the transmission plane 2 for further transmission to thereby forward the data of the user M from an MAC1 in the transmission plane 1 to the RLC2 in the transmission plane 2 for further transmission; if the bit information borne in the reserved bits is 11 (as illustrated in FIG. 7c), then the RS will forward the data to an entity RLC3 in the transmission plane 3 for further transmission to thereby forward the data of the user M from the MAC1 in the transmission plane 1 to the RLC3 in the transmission plane 3 for further transmission; or if the bit information borne in the reserved bits is 00 (as illustrated in FIG. 7d), then the RS will forward the data to an entity RLC0 in the transmission plane 0 for further transmission to thereby forward the data of the user M from the MAC1 in the transmission plane 1 to the RLC0 in the transmission plane 0 for further transmission.

Furthermore the RS and the eNodeB can alternatively determine a second transmission plane where an RLC entity, consistent with an RLS entity identifier corresponding to bit information borne in a bit reserved in an MAC layer header of transmission data at the MAC layer in a first transmission plane, is located according to the bit information borne in the bit reserved in the MAC layer header of the transmission data and a preset correspondence relationship between the bit information and the RLC entity identifier, and then forward the transmission data at the MAC layer in the first transmission plane to the RLC entity in the determined second transmission plane for further transmission.

Figure 8:
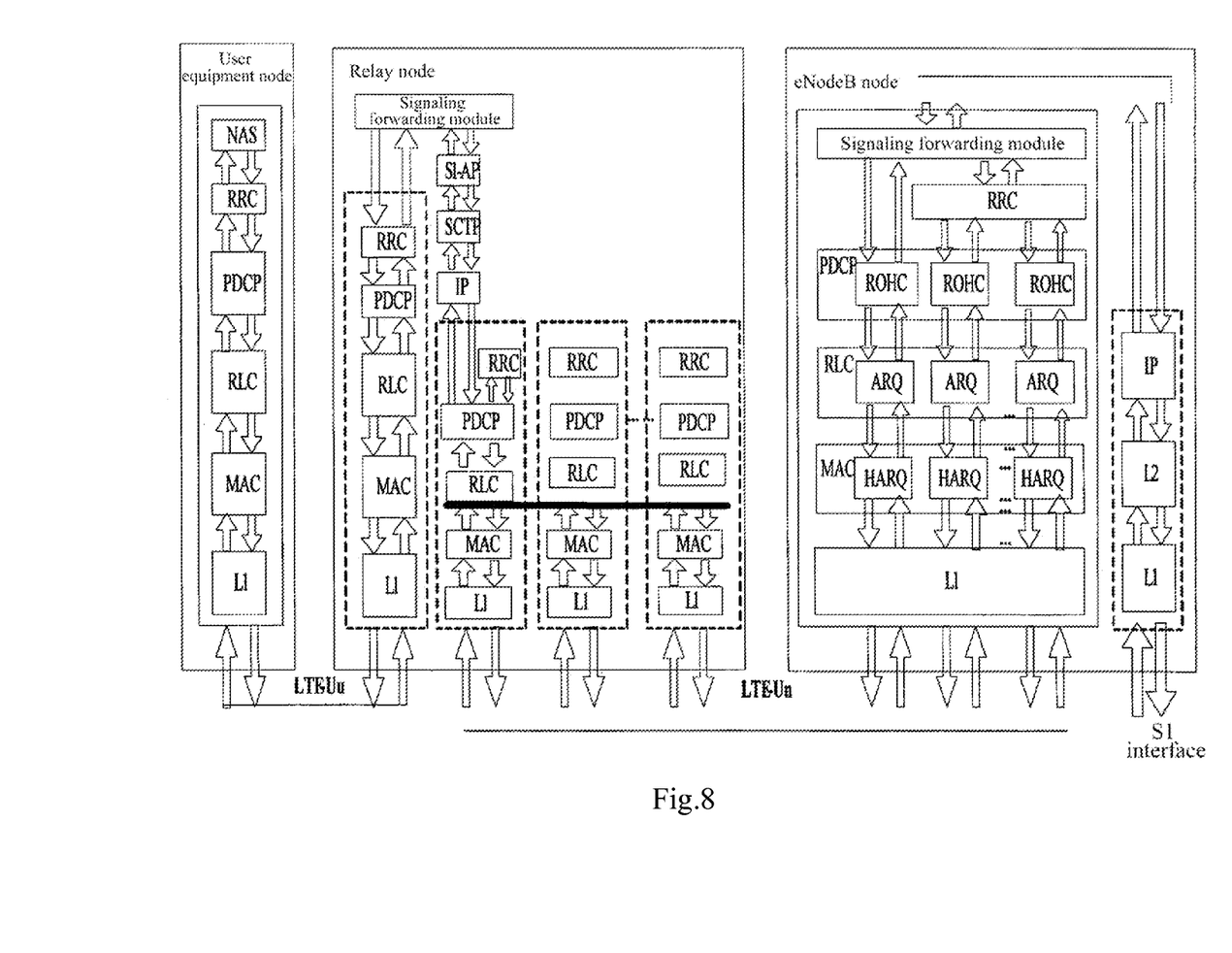
FIG. 8 is a schematic diagram of a process in which the relay and the eNodeB transmit retransmission data over a plurality of control transmission planes configured in their own protocol stacks of Un interface according to an embodiment of the invention.

Reference is made to FIG. 8 illustrating a schematic diagram of a process in which the relay and the eNodeB transmit retransmission data over a plurality of control transmission planes configured in their own protocol stacks of Un interface according to an embodiment of the invention.

Figure 9:
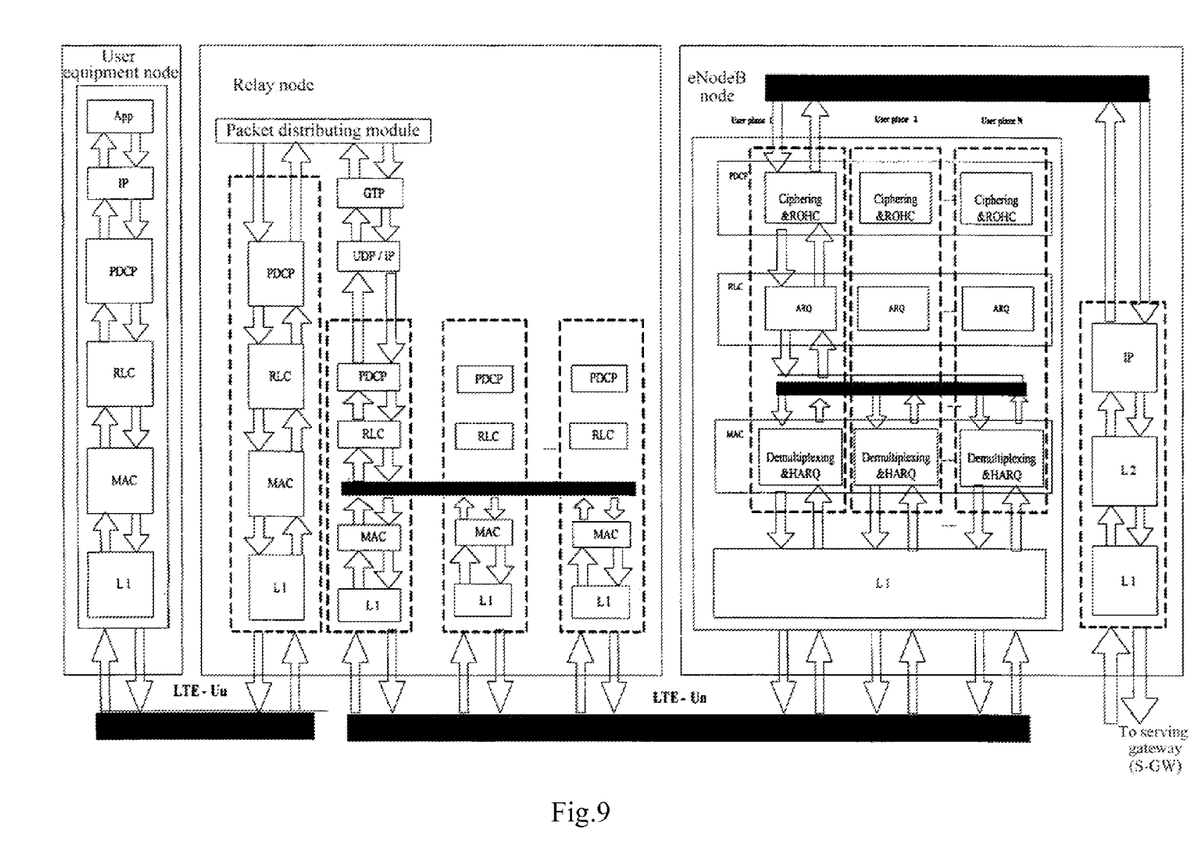

Reference is made to FIG. 9 illustrating a schematic diagram of a process in which the relay and the eNodeB transmit retransmission data over a plurality of user transmission planes configured in their own protocol stacks of Un interface according to an embodiment of the invention.

Thus according to a coding scheme of bits reserved in an MAC sub-header, the relay and the eNodeB can allocate the plurality of user transmission planes and control transmission planes configured on the protocol stacks of Un interface to be occupied for data with different QoS demands, for data transmitted from and received by different UEs, or for new transmission data or retransmission data or for other data.

Correspondingly a device for transmitting data based on a relay mobile communication system according to the embodiment can be a relay (e.g., a Relay Node (RN), a Relay Station (RS), etc.) or an eNodeB in the relay mobile communication system, and there are at least two transmission planes configured on a protocol stack of Un interface of the device. Furthermore the device further includes a data transmission unit configured to transmit data over the at least two transmission planes configured on the protocol stack of Un interface.

In a preferred embodiment of the invention, the data transmission unit particularly includes:

A sub-unit configured to divide the at least two transmission planes configured on the protocol stack of Un interface into at least two groups; and A sub-unit configured to transmit new transmission data over one of the divided-into groups of transmission planes and retransmission data over another divided-into group of transmission planes.

In a preferred embodiment of the invention, the data transmission unit particularly includes:

A sub-unit configured to determine a Quality of Service (QoS) level required for the data to be transmitted;

A sub-unit configured to select a transmission plane, over which the determined QoS level can be provided, from the at least two transmission planes configured on the protocol stack of Un interface; and A sub-unit configured to transmit the data to be transmitted over the selected transmission plane.

In a preferred embodiment of the invention, the data transmission unit particularly includes:

A sub-unit configured to determine among the at least two transmission planes configured on the protocol stack of Un interface a transmission plane serving a UE, corresponding to the transmission data, identified by the identifier of the UE according to the identifier of the UE; and A sub-unit configured to transmit the data to be transmitted over the determined transmission plane.

In a preferred embodiment of the invention, the data transmission unit particularly includes:

A sub-unit configured to determine among the at least two transmission planes configured on the protocol stack of Un interface a second transmission plane where a Radio Layer Control, RLC, entity, consistent with an RLC entity identifier represented in bit information borne in a bit reserved in an MAC layer header of the transmission data at the Media Access Control (MAC) layer in a first transmission plane, is located according to the bit information; and A sub-unit configured to forward the transmission data at the MAC layer in the first transmission plane to the RLC entity in the determined second transmission plane for further transmission.

In a preferred embodiment of the invention, the data transmission unit particularly includes:

A sub-unit configured to determine a second transmission plane where an RLC entity, consistent with an RLC entity identifier corresponding to bit information borne in a bit reserved in an MAC layer header of the transmission data at the MAC layer in a first transmission plane, is located according to the bit information borne in the bit reserved in the MAC layer header of the transmission data and a preset correspondence relationship between the bit information and the RLC entity identifier; and A sub-unit configured to forward the transmission data at the MAC layer in the first transmission plane to the RLC entity in the determined second transmission plane for further transmission.

In a preferred embodiment of the invention, the data transmission unit particularly includes:

A sub-unit configured to transmit the data in one MAC Protocol Data Unit (PDU) generated respectively in each of the at least two transmission planes configured on the protocol stack of Un interface.

In a preferred embodiment of the invention, the data transmission unit particularly includes:

A sub-unit configured to transmit the data over the at least two transmission planes, configured on the protocol stack of Un interface, among which at least one protocol layer entity among an MAC layer entity, an RLC layer entity and a Packet Data Convergence Protocol (PDCP) layer entity is shared; or A sub-unit configured to transmit the data over the at least two transmission planes configured on the protocol stack of Un interface respectively through their own MAC layer entities, RLC layer entities and PDCP layer entities.

Reference can be made to the foregoing detailed description of the method for a detailed implementation in which the data transmission unit transmits the data over the at least two transmission planes configured on the protocol stack of Un interface, and a repeated description will be omitted here.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data based on a relay mobile communication system, comprising:
    configuring at least two transmission planes on protocol stacks of Un interface of a relay device and an eNodeB; and
    the relay device and the eNodeB transmitting data over the at least two transmission planes configured on the protocol stacks of Un interface,
    wherein one Media Access Control, MAC, Protocol Data Unit, PDU, is generated respectively in each of the transmission planes, and the data is transmitted in the generated MAC PDU,
    and wherein the data is transmitted over the at least two transmission planes between which at least one protocol layer entity among an MAC layer entity, a Radio Link Control, RLC, layer entity and a Packet Data Convergence Protocol, PDCP, layer entity is shared; or
    the data is transmitted over the at least two transmission planes respectively through their own MAC layer entities, RLC layer entities and PDCP layer entities.

2. The method according to claim 1, wherein the MAC layer entity generates a plurality of MAC PDUs respectively in a plurality of Hybrid Automatic Repeat reQuest, HARQ, processes when the MAC layer entity is shared among the at least two transmission planes.

3. The method according to claim 1, wherein the relay device and the eNodeB transmitting the data over the at least two transmission planes comprises:

the relay device and the eNodeB dividing the at least two transmission planes configured on the protocol stacks of Un interface into at least two groups; and transmitting new transmission data over one of the divided-into groups of transmission planes and retransmission data over another divided-into group of transmission planes.

4. The method according to claim 1, wherein the relay device and the eNodeB transmitting the data over the at least two transmission planes comprises:

the relay device and the eNodeB determining a Quality of Service, QoS, level required for the data to be transmitted;

the relay device and the eNodeB selecting a transmission plane, over which the determined QoS level can be provided, from the at least two transmission planes configured on the protocol stacks of Un interface; and the relay device and the eNodeB transmitting the data to be transmitted over the selected transmission plane.

5. The method according to claim 1, wherein the relay device and the eNodeB transmitting the data over the at least two transmission planes comprises:

the relay device and the eNodeB determining among the at least two transmission planes configured on the protocol stacks of Un interface a transmission plane serving a UE, corresponding to the transmission data, identified by the identifier of the UE according to the identifier of the UE; and transmitting the data to be transmitted over the determined transmission plane.

6. The method according to claim 1, wherein the transmission planes comprise a user transmission plane and a control transmission plane;

wherein the user transmission plane comprises a physical layer, an Media Access Control, MAC, layer, a Radio Link Control, RLC, entity layer and a Packet Data Convergence Protocol, PDCP, layer; and wherein the control transmission plane comprises a physical layer, an MAC layer, a RLC entity layer, a PDCP layer and a Radio Resource Control, RRC, layer.

7. The method according to claim 6, wherein the relay device and the eNodeB transmitting the data over the at least two transmission planes comprises:

the relay device and the eNodeB determining among the at least two transmission planes configured on the protocol stacks of Un interface a second transmission plane where an RLC entity, consistent with an RLC entity identifier represented in bit information borne in a bit reserved in an MAC layer header of the transmission data at the MAC layer in a first transmission plane, is located according to the bit information; and forwarding the transmission data at the MAC layer in the first transmission plane to the RLC entity in the determined second transmission plane for further transmission.

8. The method according to claim 6, wherein the relay device and the eNodeB transmitting the data over the at least two transmission planes comprises:

the relay device and the eNodeB determining a second transmission plane where an RLC entity, consistent with an RLC entity identifier corresponding to bit information borne in a bit reserved in an MAC layer header of the transmission data at the MAC layer in a first transmission plane, is located according to the bit information borne in the bit reserved in the MAC layer header of the transmission data and a preset correspondence relationship between the bit information and the RLC entity identifier; and forwarding the transmission data at the MAC layer in the first transmission plane to the RLC entity in the determined second transmission plane for further transmission.

9. A device for transmitting data based on a relay mobile communication system, comprising:

at least two transmission planes configured on a protocol stack of Un interface of the device, wherein one Media Access Control, MAC, Protocol Data Unit, PDU, is generated respectively in each of the transmission planes; and a data transmission unit configured to transmit data over the at least two transmission planes configured on the protocol stack of Un interface, wherein the data is transmitted in the generated MAC PDU, and the data transmission unit further comprises:

a sub-unit configured to transmit the data over the at least two transmission planes, configured on the protocol stack of Un interface, among which at least one protocol layer entity among an MAC layer entity, an RLC layer entity and a Packet Data Convergence Protocol, PDCP, layer entity is shared; or a sub-unit configured to transmit the data over the at least two transmission planes configured on the protocol stack of Un interface respectively through their own MAC layer entities, RLC layer entities and PDCP layer entities.

10. The device according to claim 9, wherein the data transmission unit further comprises:

a sub-unit configured to divide the at least two transmission planes configured on the protocol stack of Un interface into at least two groups; and a sub-unit configured to transmit new transmission data over one of the divided-into groups of transmission planes and retransmission data over another divided-into group of transmission planes.

11. The device according to claim 9, wherein the data transmission unit further comprises:

a sub-unit configured to determine a Quality of Service, QoS, level required for the data to be transmitted;

a sub-unit configured to select a transmission plane, over which the determined QoS level can be provided, from the at least two transmission planes configured on the protocol stack of Un interface; and a sub-unit configured to transmit the data to be transmitted over the selected transmission plane.

12. The device according to claim 9, wherein the data transmission unit further comprises:

a sub-unit configured to determine among the at least two transmission planes configured on the protocol stack of Un interface a transmission plane serving a UE, corresponding to the transmission data, identified by the identifier of the UE according to the identifier of the UE; and a sub-unit configured to transmit the data to be transmitted over the determined transmission plane.

13. The device according to claim 9, wherein the data transmission unit further comprises:

a sub-unit configured to determine among the at least two transmission planes configured on the protocol stack of Un interface a second transmission plane where an RLC entity, consistent with an RLC entity identifier represented in bit information borne in a bit reserved in an MAC layer header of the transmission data at the Media Access Control, MAC, layer in a first transmission plane, is located according to the bit information; and a sub-unit configured to forward the transmission data at the MAC layer in the first transmission plane to the RLC entity in the determined second transmission plane for further transmission.

14. The device according to claim 9, wherein the data transmission unit further comprises:

a sub-unit configured to determine a second transmission plane where an RLC entity, consistent with an RLC entity identifier corresponding to bit information borne in a bit reserved in an MAC layer header of the transmission data at the MAC layer in a first transmission plane, is located according to the bit information borne in the bit reserved in the MAC layer header of the transmission data and a preset correspondence relationship between the bit information and the RLC entity identifier; and a sub-unit configured to forward the transmission data at the MAC layer in the first transmission plane to the RLC entity in the determined second transmission plane for further transmission.

15. The device according to claim 9, wherein the data transmission unit further comprises:

a sub-unit configured to transmit the data in one MAC Protocol Data Unit, PDU, generated respectively in each of the at least two transmission planes configured on the protocol stack of Un interface.

* * * * *